Aug. 1, 1961     M. P. PUPILLA, JR     2,994,533

TEACHING DEVICE FOR BOWLERS

Filed Aug. 18, 1959

*INVENTOR.*
MATTHEW P. PUPILLA, JR.

BY *Jerome Bauer*

ATTORNEY.

United States Patent Office 2,994,533
Patented Aug. 1, 1961

2,994,533
TEACHING DEVICE FOR BOWLERS
Matthew P. Pupilla, Jr., 2 Kent Road,
New Hyde Park Manor, N.Y.
Filed Aug. 18, 1959, Ser. No. 834,480
6 Claims. (Cl. 273—54)

This invention relates to a device for teaching bowlers the desired movement of the hand in throwing a bowling ball and to indicate errors in the throw so the same may be corrected.

It is an object of the invention to provide a bowler with a device that will indicate the direction of movement of the hand and consequent direction of movement of the bowling ball as the same leaves the bowler's hand.

It is another object of the invention to teach bowlers to throw the ball properly and consistently. The use of the present invention by bowlers teaches them the proper ball throwing movement by permitting them to take consistent sightings on a desired spot or object on the bowling alley and to accurately release the ball at such spot or object at each throw of the ball whereby, after a period of use of the present invention, the correct throwing movements become almost mechanical and the need for the continued use for the invention is eliminated.

Still another object of the invention is to enable the bowler to visually observe the errors in his throwing motion, to correct such errors and learn the proper techniques of bowling by being able to see the movement of the bowling hand during its throwing movement and as the ball leaves the hand.

Features of the invention reside in the unique and simple construction of the teaching device that requires few parts to manufacture, one that is inexpensive to make, and a device that has so few parts as to require no mechanical aptitude for its operation.

Figure 1:
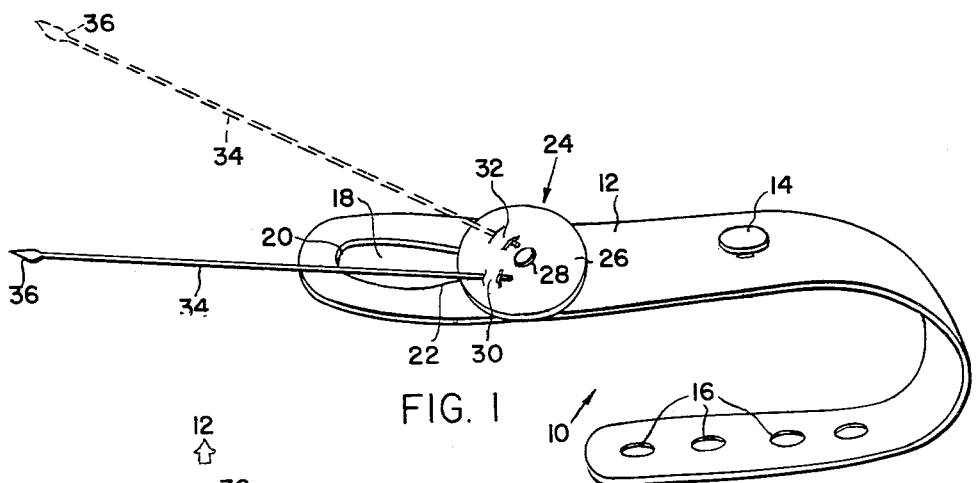
Figure 2:
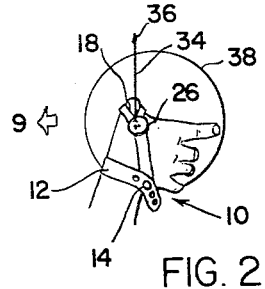
Figure 3:
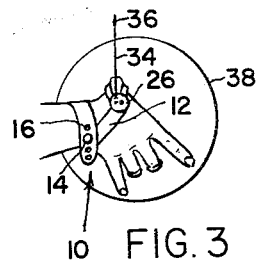
Figure 5:
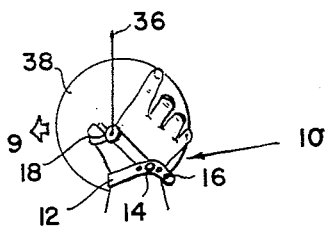
Figure 4:
Figure 7:
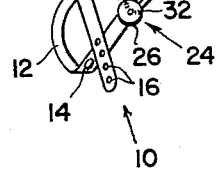
Figure 6:
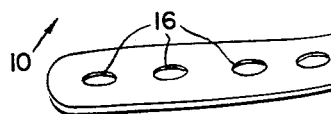

Other and further objects of my invention reside in the structures and arrangements hereinafter more fully described with reference to the accompanying drawings in which:

FIG. 1 is a perspective view of the teaching device constructed in accordance with disclosure of the invention, FIG. 2 is a top view showing the device in use to throw a straight ball, FIG. 3 is a side view of FIG. 2, FIG. 4 is a front view of a bowler depicting the invention in use to throw a hook ball, FIG. 5 is a top view of the invention as shown in FIG. 4, FIG. 6 is a side view of FIG. 5, and FIG. 7 depicts the manner of securement of the present invention on the hand of a bowler.

Referring to the figures of the drawings, the indicator device of the present invention for teaching bowlers the desired movement in throwing a bowling ball is generally identified by the numeral 10. Device 10 comprises a substantially flat elongated member 12 that may be conveniently referred to as a strap since the same is adapted to be secured in position about that portion of the body of the bowler which is to release the bowling ball, namely, the hand. The strap 12 may be made of any convenient material. Although, in practice, a soft polyethylene plastic has been employed for the purpose because of its flexible plastic nature, other materials as leather, canvas, rubber and the like have been found suitable.

The strap 12 may be of any desired width and thickness, the sole restriction being one of comfort. That is to say, the strap should be of such width and thickness as not to interfere with the normal comfort of the bowler while playing the game. Its purpose is not to physically restrict the movements of the bowler, but to guide and indicate to him the proper bowling movement of the hand.

The body of the strap 12 is elongated in length and must be sufficiently long to enable the same to be wrapped about the wrists of different users. To securely yet releasably fasten the strap to the user, it is provided with a convenient releasable fastener member 14. the fastener member 14 here shown in the form of a button that extends upwardly from the top side of the strap body 12 and made integral therewith at its lower end. However, as the description proceeds it will be understood that other fastening members may be applicable also.

Defined in the trailing end of the strap 12 are a plurality of substantially aligned yet longitudinally spaced fastening openings 16. The openings 16 are slightly smaller than the head of the fastener member 14. However, because the material 14 of the strap 12 is flexible and plastic the defining walls of the openings 16 will "give" or stretch sufficiently to permit the larger head of the member 14 to pass therethrough.

Defined in the opposite forward end of the strap 12 is a placement opening 18. The opening 18 is shaped substantially like a tear drop having a rounded forward portion 20 and a narrowed end 22. The placement opening is so shaped as to receive therein a digit of the bowling hand, namely, the thumb. The shape of the digit placement opening 18 comfortably and conveniently accommodates the thumb and because of its shape, causes the strap to assume a comfortable predetermined position relative to the back of the hand.

Mounted on the top surface of the strap 12 is an indexing mechanism generally identified by the numeral 24. The mechanism 24 comprises a plate like member 26 that is fixed on the strap 12, but movable relative thereto about a mounting pin 28. Provided in the index mechanism 24 and comprising a portion thereof are a plurality of indicator positioning means 30 and 32.

The positioning means 30 and 32 are formed inexpensively on the member 26 by striking against the underside thereof to result in protrusions that project upwardly from the top surface. The striking of the member 26 to form the protrusions 30 and 32 causes a tearing of the material of the member 26 and results in the formation of an opening at the forward and back ends of each protrusion. Each set of these openings of each positioning protrusion 30 and 32 are aligned to permit the insertion of a sighting wand or indicator to completely therethrough as shown in FIG. 1. The raised body portion of each protrusion overlays the inserted rear end of the wand to retain the same fixed to the member 26 of the index mechanism 24.

In order to enable its proper operation the index mechanism 24 is positioned adjacent or proximate the narrowed portion 22 of the digit opening 18. Hence, when the thumb is received in the opening 18 the mechanism 24 will be located proximate the base of the thumb and at the back of the hand. Each indicator positioning means 30 and 32 is strategically located on the member 26 to assure the correct placement of the indicator 34 relative to the digits of the hand and to the strap 12 that supports the device 10 to the hand.

The indicator positioning means 30 is utilized to teach the proper technique of throwing the bowling ball in a straight line, otherwise referred to as a "straight ball." The forward and rear openings of the protrusion 30 through which the rear end of the indicator 34 is adapted to be passed are aligned along a secant in the member 26 with respect to the mounting pin 28 as shown by the full lines in FIG. 1.

The openings of the protrusions 32 are aligned radially on the member 26 with respect to the mounting pin 28. Thus, when the indicator member 34 is positioned beneath the protrusion 32, it will assume a sighting relationship with the digits of the bowler's hand such that the bowler will be taught the proper position for throwing a "hook" ball. The proper location of the indicator member 34 on the index member 26 for a "hook" ball is beneath the protrusion 32 in the manner shown by the dash lines in FIG. 1.

In actual practice the teaching and indicator device 10 is secured to the hand of the bowler. This is accomplished by inserting the thumb or first digit through the tear-shaped forward opening 18 of the support strap 12 such that the narrowed portion 22 terminates at the back of the hand near the base of the thumb. This relationship may be seen more clearly in FIGS. 2 to 6 inclusive. The body portion of the strap is then wrapped about the wrist of the hand in the direction of the last digit. Thereafter, the trailing end of strap support 12 is continued around beneath the wrist, adjacent the palm, and then back up across the back of the wrist to align one of the appropriate holes or fastening openings 16 with the fastening means 14 as shown in FIG. 7.

The numerous openings 16 enable the support strap 12 to be used by bowlers, all of whom may have different wrist sizes. The fastening means 14 is then inserted through the appropriate fastening opening 16 aligned therewith. As previously described, because of the plastic and flexible nature of the material of the strap 12, the defining walls of the smaller openings 16 will expand slightly, sufficiently to permit the head of the fastening means 14 to enter thereinto and to secure the strap support 12 about the wrist of the bowler and to the back of the hand. The relationship of the support strap 12 now fastened to the back of the hand positions the index mechanism 24 at the base of the thumb that passes through the digit opening 18.

In the event the bowler desires to learn the proper technique of throwing a straight ball, the sighting indicator 34 is inserted through the aligned openings of the protruding positioning means 30 on the indexing mechanism 24 as shown by the solid lines in FIG. 1 and as in FIGS. 2 and 3. In such case, the head or forward end 36 of the indicator member 34 is positioned directly over the thumb that is engaged within the ball 38. The thumb, in turn, is positioned at 12 o'clock when the bowler faces the pins in the alley. The forward end 26 of the sighting indicator 34 is of sufficient length to extend forwardly and beyond the thumb to provide the bowler with a sufficiently long line of sight that is fixed to his bowling hand and which he may align with a desired spot or other object on the bowling alley.

As the bowler drops his hand in the rearward pendulum-like windup he automatically sights along the indicator member 34 and directionally aligns the same with his desired spot or object on the bowling alley. Because the indicator member 34 is fixedly supported to the hand and extends therebeyond, it actually permits the bowler to perceive the movements of his hand during the windup and follow-through of the throw without, however, looking directly at it. In this way the bowler can correct any twist or undesired motion of the arm or hand during the throwing movement. After continued use of the inventive device 10 the bowler's movements will gradually become substantially mechanical until finally the use of the inventive device will be no longer necessary once the proper technique of throwing the ball has been mastered.

Substantially the same situation prevails with respect to those experienced bowlers who attempt to master the throwing of a ball that will curve or hook during its travel along the bowling alley. For a "hook" ball, the thumb is positioned facing toward the left or in the direction of 9 o'clock as at the hour hand of a clock as shown in FIGS. 4, 5 and 6; however, the sighting indicator member 34 is now positioned within the positioning protrusion means 32 as shown in dash lines in FIG. 1 and in solid lines in FIGS. 4, 5 and 6. In such case the indicator member 34 is centered between the thumb and the index finger pointing in the direction of 12 o'clock along the bowling alley.

At times the spread between the thumb and index finger will vary from one bowler to another. For this reason, therefore, the index plate member 26 must be capable of movement about the mounting pin 28 relative to the support strap 12 and to the digits of the hand. Therefore, by proper adjustment and movement of the index plate member 26, the sighting indicator 34 may have its forward end 36 positioned at the joint of the thumb and forefinger and pointing in the direction of the bowling pins standing in the bowling alley.

Once again, as in the throwing of the straight ball, as the bowler brings his hand back in the pendulum movement or windup for the throw, he automatically sights and aligns the proper portions of his hand—permitted by the predetermined correct positioning of the indicator member 34 to the back thereof—with the desired spot or object on the bowling alley. Because of his ability to see the movement of the sighting indicator without actually watching his hand, he can perceive his mistakes. Thus, if the hand should twist or turn during the throwing movement the sighting indicator will become disaligned with the desired spot or object at which the bowler has picked to sight the throw of his ball. He will be able to see this disaligning movement and correct it during the throw.

It has also been found possible to teach and perfect other throwing maneuvers of a bowling ball by the use of the present invention; for example, the instant invention permits a thrower to perfect the throwing of a "back-up" ball. In practice this has been enabled by a new and proper positioning of the member 34 on member 26 and then moving the index member 26 relative to the support strap 12 and to the digits of the hand to which the same is secured. However, the ability to teach and indicate the proper performance of other ball throwing maneuvers may require more or equivalent structures similar to that of the positioning means 30 and 32 illustrated and described. Further, although the device 10 has been shown in use by a right handed bowler, that is to say, by one who throws the ball with the right hand, it is obvious that the device may be used with equal ability by left handed players.

In order to provide a full and complete understanding of the invention, it is noted that the illustrations are presented in their simplest form. Those who are skilled in the art will readily recognize that a more complex indexing mechanism may obviously be provided to teach the proper throwing movement to cause the ball to follow and perform more complex maneuvers. Accordingly, the concept of the invention is not intended to be limited in any manner by the particular indexing mechanism here shown since it is within the contemplation of the invention that a more expensive and all inclusive indexing mechanism may be provided.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. An indicator device for bowlers comprising sighting means adapted to be mounted on the back of the bowling hand at the base of the thumb, said sighting means extending forwardly and beyond the confines of the hand when the bowling ball is grasped thereby, strap means extending about the wrist of the hand and having an opening defined therein to receive the thumb, means to secure said strap means to the hand, and index means on said strap means to mount said sighting means at the base of the thumb on the back of the hand, said index means coacting with said sighting means to adjust the position of the same relative to the hand.

2. A device to teach bowlers the desired movement in throwing a bowling ball comprising, a sighting indicator adapted to be adjusted to a predetermined position with respect to the hand of the bowler to provide the bowler with an indication of a line of sight along which the bowling ball is to be released from the hand means to support said sighting indicator on the hand of the bowler, and index means on said support means to adjust said sighting indicator to said predetermined position with respect to the hand of the bowler.

3. A device to indicate to bowlers the desired direction of movement of a bowling ball comprising strap means having an opening therein to receive a digit of the hand of the bowler, said strap means having a portion thereon coextensive with said opening and including means to secure said strap means to the hand of the bowler, positioning means on said strap means, and indicating means cooperable with said positioning means to be predeterminately positioned thereby and extending beyond said positioning means.

4. A device to indicate the direction of movement of the hand of a bowler comprising means adapted to be secured to the hand of the bowler and having a portion thereon to receive and position the same relative to the thumb of the hand, means extending forward of the thumb of the hand to provide the bowler with an indication of the direction of movement of the bowling hand, and means on said first named means to vary the position of said second named means on said first named means.

5. A teaching device for bowlers comprising strap means to be secured to the hand of the bowler and to a digit thereof, means on said strap means to secure the same to the hand and digit of the bowler, indicator means on said strap means adapted to be positioned thereby on the back of the bowling hand, said indicator means extending beyond said digit when the bowling ball is gripped in the hand, and means between said strap means and indicator means to adjustably position said indicator means on said strap means.

6. An indicating device for bowlers comprising strap means having an opening therein adapted to receive the thumb of the hand of the bowler and to be secured about the wrist thereof, index means on said strap means proximate said opening and adapted to be positioned adjacent the base of said thumb by said strap means, a sighting indicator on said strap means and adapted to be positioned thereby at the back of the bowling hand, said sighting indicator extending beyond said thumb of the bowling hand, and means on said index means to adjustably position said sighting indicator relative to said thumb.

References Cited in the file of this patent
UNITED STATES PATENTS

| | | |
|---|---|---|
| 1,169,188 | Peck | Jan. 25, 1916 |
| 2,191,683 | Roberts | Feb. 27, 1940 |
| 2,723,125 | Comee | Nov. 8, 1955 |
| 2,794,638 | Risher et al. | June 4, 1957 |